(12) United States Patent
Xu et al.

(10) Patent No.: US 9,083,406 B2
(45) Date of Patent: Jul. 14, 2015

(54) DATA TRANSMISSION METHOD, APPARATUS, AND SYSTEM

(71) Applicant: Huawei Technologies Co., Ltd., Shenzhen (CN)

(72) Inventors: Wenying Xu, Shanghai (CN); Xueli Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/290,376

(22) Filed: May 29, 2014

(65) Prior Publication Data

US 2014/0314168 A1    Oct. 23, 2014

Related U.S. Application Data

(63) Continuation of application No. PCT/CN2012/084808, filed on Nov. 19, 2012.

(30) Foreign Application Priority Data

Nov. 30, 2011    (CN) .......................... 2011 1 0390222

(51) Int. Cl.
*H04B 7/02* (2006.01)
*H04B 7/06* (2006.01)
*H04B 7/04* (2006.01)

(52) U.S. Cl.
CPC .............. *H04B 7/061* (2013.01); *H04B 7/0413* (2013.01); *H04B 7/0456* (2013.01); *H04B 7/0619* (2013.01); *H04B 7/0623* (2013.01); *H04B 7/0632* (2013.01); *H04B 7/0691* (2013.01)

(58) Field of Classification Search
CPC ... H04L 1/0026; H04L 1/0003; H04L 1/0025; H04L 1/06; H04L 1/0693; H04L 1/0625; H04L 1/0017; H04L 1/0019; H04L 1/0022; H04B 7/0417; H04B 7/0632; H04B 7/0639; H04B 7/061; H04B 7/0626; H04B 7/0643; H04B 7/0619; H04B 7/02
USPC .................................. 375/267, 299, 347–349
See application file for complete search history.

(56) References Cited

U.S. PATENT DOCUMENTS 7,126,996 B2 * 10/2006 Classon et al. ................ 375/260
7,873,113 B2 *  1/2011 Takano et al. ................. 375/267
(Continued)

FOREIGN PATENT DOCUMENTS

CN      1947355 A    4/2007
CN    101562904 A   10/2009
(Continued)

OTHER PUBLICATIONS

3rd Generation Partnership Project; Technical Specification Group Radio Access Network; Multiplexing and channel coding (FDD) (Release 5), 3GPP TS 25.212, V5.10.0, Jun. 2005, 72 pages.
(Continued)

*Primary Examiner* — Emmanuel Bayard
(74) *Attorney, Agent, or Firm* — Slater & Matsil, L.L.P.

(57) ABSTRACT

Embodiments of the present invention provide a data transmission method, apparatus, and system. The method includes receiving transmitter antenna quality information sent by a receiver; determining, according to the transmitter antenna quality information, a transmitter antenna that transmits data; switching a first transmission mode to a second transmission mode when the transmitter antenna quality information satisfies a preset condition; and transmitting the data by using the second transmission mode and the determined transmitter antenna.

20 Claims, 4 Drawing Sheets

(56) References Cited

U.S. PATENT DOCUMENTS

| | | | |
|---|---|---|---|
| 7,889,130 B2* | 2/2011 | Murakami et al. | 342/377 |
| 8,036,257 B2* | 10/2011 | Mailaender | 375/148 |
| 8,081,581 B2* | 12/2011 | Vojnovic et al. | 370/254 |
| 8,098,752 B2* | 1/2012 | Hwang et al. | 375/260 |
| 8,144,797 B2* | 3/2012 | Mujtaba et al. | 375/267 |
| 8,542,776 B2* | 9/2013 | Kim et al. | 375/316 |
| 8,725,084 B2* | 5/2014 | Lou et al. | 455/69 |
| 8,885,746 B2* | 11/2014 | Moulsley et al. | 375/267 |
| 8,908,496 B2* | 12/2014 | Kadous | 370/216 |
| 2005/0068909 A1* | 3/2005 | Chae et al. | 370/278 |
| 2006/0093066 A1* | 5/2006 | Jeong et al. | 375/299 |
| 2006/0109931 A1* | 5/2006 | Asai et al. | 375/299 |
| 2008/0188192 A1* | 8/2008 | Chae et al. | 455/129 |
| 2009/0034639 A1* | 2/2009 | Hwang et al. | 375/260 |
| 2009/0245408 A1* | 10/2009 | Mujtaba et al. | 375/267 |
| 2009/0316802 A1* | 12/2009 | Tong et al. | 375/260 |
| 2010/0254330 A1* | 10/2010 | Lee et al. | 370/329 |
| 2011/0085504 A1* | 4/2011 | Chong et al. | 370/329 |
| 2011/0124290 A1* | 5/2011 | Lou et al. | 455/63.1 |
| 2012/0170674 A1* | 7/2012 | Kim et al. | 375/267 |
| 2012/0189077 A1* | 7/2012 | Seo et al. | 375/267 |
| 2013/0316665 A1* | 11/2013 | Kim et al. | 455/101 |
| 2014/0286271 A1* | 9/2014 | Kim et al. | 370/329 |
| 2014/0362812 A1* | 12/2014 | Ko et al. | 370/329 |
| 2015/0055502 A1* | 2/2015 | Seo et al. | 370/252 |

FOREIGN PATENT DOCUMENTS

| | | |
|---|---|---|
| CN | 101582712 A | 11/2009 |
| CN | 101710839 A | 5/2010 |
| CN | 101848023 A | 9/2010 |
| CN | 102055567 A | 5/2011 |
| WO | 2005076758 A3 | 8/2005 |

OTHER PUBLICATIONS

3rd Generation Partnership Project; Technical Specification Group Radio Access Network; Multiplexing and channel coding (FDD) (Release 7), 3GPP TS 25.212, V7.12.0, Mar. 2014, 103 pages.

3rd Generation Partnership Project; Technical Specification Group Radio Access Network; Physical layer procedures (FDD) (Release 5), 3GPP TS 25.214, V5.11.0, Jun. 2005, 51 pages.

3rd Generation Partnership Project; Technical Specification Group Radio Access Network; Physical layer procedures (FDD) (Release 7), 3GPP TS 25.214, V7.17.0, Dec. 2010, 88 pages.

* cited by examiner

DATA TRANSMISSION METHOD, APPARATUS, AND SYSTEM

This application is a continuation of International Application No. PCT/CN2012/084808 filed on Nov. 19, 2012, which claims priority to Chinese Patent Application No. 201110390222.5, filed on Nov. 30, 2011, both of which are hereby incorporated by reference in their entireties.

TECHNICAL FIELD

The embodiment of the present invention relates to the field of communications technologies, and in particular, to a multi-transmission manner switching method and apparatus.

BACKGROUND

As the communications technologies develop rapidly, in order to improve a downlink peak rate, downlink multiple input multiple output (MIMO) is introduced in the version Rel-7 of wideband code division multiple access (WCDMA).

In MIMO technologies, a base station (NodeB) sends data to a terminal (UE) through a high speed downlink shared channel (HS-DSCH) of a physical layer, and meanwhile, sends control signaling related to the HS-DSCH through a high speed physical downlink shared control channel (HS-SCCH). After receiving the HS-SCCH, the UE performs demodulation, decoding and the like on the HS-DSCH by using control information borne on the HS-SCCH. Then, the UE generates ACK/NACK information according to a reception situation of the HS-SCCH and whether the HS-DSCH is decoded correctly. In addition, the UE further measures a downlink channel status, generates channel quality indicator (CQI) information, and selects a precoding matrix, which makes channel capacity be maximum, to generate a precoding control indication (PCI). The UE sends the ACK/NACK information, CQI information and PCI information to the NodeB by using an uplink high-speed dedicated physical control channel (HS-DPCCH) to bear them. The NodeB uses the CQI information fed back by the UE as a basis for service scheduling, and performs data channel precoding according to a reported PCI.

It has been determined that MIMO is extremely sensitive to placement of an antenna, so that if only a position status of the antenna is slightly changed, a throughput or signal to noise ratio fluctuates dramatically, and especially in an MIMO mode, when received power from two antennas is not balanced, a probabilistic negative gain is incurred to single stream in MIMO mode compared with legacy HSDPA with single antenna.

SUMMARY OF THE INVENTION

Embodiments of the present invention provide a data transmission method, apparatus and system, so as to solve a technical problem that when received power from two antennas is not balanced, a probabilistic negative gain is incurred to single stream in MIMO mode compared with legacy HSDPA with single antenna.

In order to solve the technical problem, an embodiment of the present invention provides a data transmission method comprising receiving transmitter antenna quality information sent by a receiver and determining, according to the transmitter antenna quality information, a transmitter antenna that transmits data. A first transmission mode is switched to a second transmission mode when the transmitter antenna quality information satisfies a preset condition. The data is transmitted by using the second transmission mode and the determined transmitter antenna.

An embodiment of the present invention further provides a data transmission method comprising measuring channel quality of all transmitter antennas of a transmitter to obtain transmitter antenna quality information. The transmitter antenna quality information includes a candidate or non-candidate transmitter antenna set or a precoding control indication implying a candidate or non-candidate transmitter antenna set. The transmitter antenna quality information is sent to the transmitter so that the transmitter determines, according to the transmitter antenna quality information, whether transmission mode switching is required to be performed.

Accordingly, an embodiment of the present invention provides a data transmission apparatus, comprising a receiving unit configured to receive transmitter antenna quality information sent by a receiver and a determining unit configured to determine, according to the transmitter antenna quality information, a transmitter antenna that transmits data. The apparatus further comprises a switching unit configured to switch a first transmission mode to a second transmission mode when the transmitter antenna quality information satisfies a preset condition and a first transmission unit configured to transmit the data by using the second transmission mode and the determined transmitter antenna.

An embodiment of the present invention further provides a data transmission apparatus comprising a measurement unit configured to measure channel quality of all transmitter antennas of a transmitter to obtain transmitter antenna quality information, where the transmitter antenna quality information includes a candidate or non-candidate transmitter antenna set or a precoding control indication implying a candidate or non-candidate transmitter antenna set. The apparatus further comprises a transmission unit configured to send the transmitter antenna quality information to the transmitter, so that the transmitter determines, according to the transmitter antenna quality information, whether transmission mode switching is required to be performed.

Accordingly, an embodiment of the present invention provides a data transmission system. The system includes a transmitter and a receiver. The transmitter includes a first data transmission apparatus. The receiver includes a second data transmission apparatus.

The first data transmission apparatus is as the foregoing corresponding data transmission apparatus. The second data transmission apparatus is as the foregoing corresponding data transmission apparatus.

It can be seen from the foregoing technical solution that, when transmitter antenna power is not balanced, a probabilistic negative gain incurred to single stream in MIMO mode compared with legacy HSDPA with single antenna is eliminated or decreased by switching a transmission mode.

DETAILED DESCRIPTION OF ILLUSTRATIVE EMBODIMENTS

In order to make persons skilled in the art better understand the solutions of the embodiments of the present invention, the embodiments of the present invention are further described in detail below with reference to the accompanying drawings and implementations.

Figure 1:
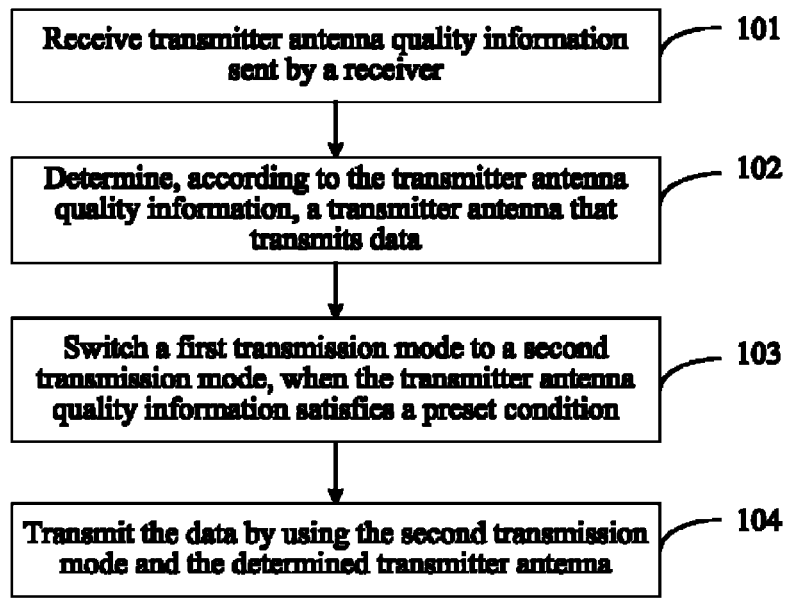
FIG. 1 is a flow chart of a first data transmission method according to an embodiment of the present invention.

Referring to FIG. 1, FIG. 1 is a flow chart of a first data transmission method according to an embodiment of the present invention. The method includes the following steps.

Step 101: Receive transmitter antenna quality information sent by a receiver.

Step 102: Determine, according to the transmitter antenna quality information, a transmitter antenna that transmits data.

Step 103: Switch a first transmission mode to a second transmission mode when the transmitter antenna quality information satisfies a preset condition.

Step 104: Transmit the data by using the second transmission mode and the determined transmitter antenna.

In this embodiment, two cases are used as examples for determination of whether the transmitter antenna quality information satisfies the preset condition, but the present invention is not limited thereto.

In one case, it is determined whether the number of transmitter antennas is consistent with the number of transmitter antennas required by the default first transmission mode, and if not consistent, the first transmission mode is switched to the second transmission mode.

In the other case, if a transmitter antenna mode switching command sent by a receiver is received, when the transmitter antenna quality information satisfies the preset condition specifically, the current first transmission mode is switched to the second transmission mode according to the mode switching command.

That is to say, in this embodiment, if a transmitter receives the transmitter antenna quality information and the mode switching command sent by the receiver, after the transmitter determines, according to the transmitter antenna quality information, the transmitter antenna that transmits data, the transmitter switches the current first transmission mode to the second transmission mode directly according to the mode switching command.

If the transmitter receives the transmitter antenna quality information sent by the receiver, after the transmitter determines, according to the transmitter antenna quality information, the transmitter antenna that transmits the data, the transmitter is further required to determine whether the number of the transmitter antennas is consistent with the number of transmitter antennas required by the default first transmission mode, and if not consistent, switch the first transmission mode to the second transmission mode.

For a specific implementation process of the foregoing process, see the following specific embodiment for details.

Figure 2:
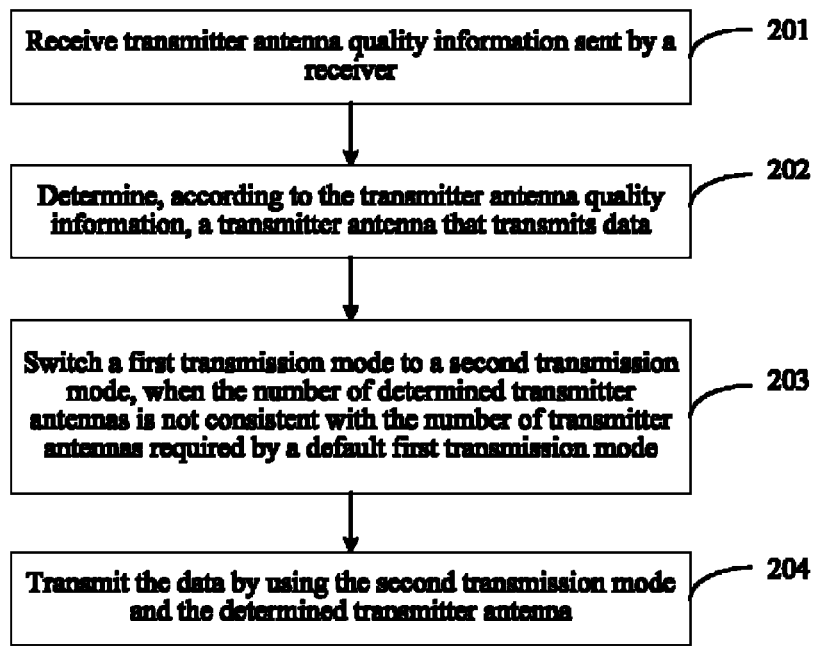
FIG. 2 is a flow chart of a second data transmission method according to an embodiment of the present invention.

Referring to FIG. 2, FIG. 2 is a flow chart of a second data transmission method according to an embodiment of the present invention. In this embodiment, transmission mode switching, namely antenna switching (AS), is introduced. The AS refers to a mode where antenna selection may be performed. However, only one antenna performs data transmission at a same time, that is, a single-antenna sending mode. The method comprises receiving transmitter antenna quality information sent by a receiver in Step 201.

In this step, the transmitter antenna quality information received by a transmitter may include: a candidate transmitter antenna (one or more may be included), and/or a non-candidate transmitter antenna (one or more may be included). In this embodiment, a transmitter antenna with good channel quality is defined as a candidate transmitter antenna, and a transmitter antenna with poor channel quality is defined as a non-candidate transmitter antenna. Multiple candidate antennas or multiple non-candidate transmitter antennas may also be referred to as a candidate antenna set or a non-candidate transmitter antenna set.

Definitely, the transmitter antenna quality information may further include other parameters, such as a precoding control indication (PCI); and may further include: a special value of a channel quality indicator that triggers transmission mode switching, such as 0 or 31, but the present invention is not limited thereto.

In Step 202, according to the transmitter antenna quality information, a transmitter antenna that transmits data is determined. If the transmitter antenna quality information includes a candidate transmitter antenna, the candidate transmitter antenna is selected as the transmitter antenna that transmits the data. If the transmitter antenna quality information includes a non-candidate transmitter antenna, the transmitter may select an antenna other than the non-candidate transmitter antenna among all antennas as the transmitter antenna that transmits the data.

In Step 203, the first transmission mode (a current transmission mode) is switched to a second transmission mode, when the number of determined transmitter antennas is not consistent with the number of transmitter antennas required by a default first transmission mode.

In a case where the default transmission mode of the transmitter (that is, the first transmission mode) is a multi-antenna sending mode, when the number of the selected transmitter antennas is one, the transmitter switches the current multi-antenna sending mode to a single-antenna sending mode.

In another case, if the default transmission mode of the transmitter is a single-antenna sending mode, when the number of the selected transmitter antennas is more than one, the transmitter switches the current single-antenna sending mode to a multi-antenna sending mode.

However, this embodiment is not limited to switching between the foregoing two transmission modes, and may also comprise switching between other similar transmission modes, for example, switching between the multi-antenna transmission mode and an adaptive transmission mode, or switching between the single-antenna transmission mode and the adaptive transmission mode, or switching between the three transmission modes, which is not limited in this embodiment.

In Step 204, the data is transmitted by using the second transmission mode and the determined transmitter antenna. After the transmission mode switching, if the second transmission mode is the single-antenna sending mode, the transmitter sends the data through a selected single transmitter antenna, and transmission of pilot information may be performed in the multi-antenna sending mode. If the second transmission mode is the multi-antenna sending mode, the transmitter transmits the data through selected multiple transmitter antennas, and transmission of pilot information may be performed in the multi-antenna sending mode.

In the embodiment of the present invention, after receiving the transmitter antenna quality information reported by the receiver, the transmitter adjusts a current data transmission manner. If the number of transmitter antennas that are determined to have good transmission channels according to the transmitter antenna quality information, and when the number of the determined transmitter antennas is not consistent with the number of transmitter antennas required by the default first transmission mode, the transmitter switches the current transmission mode, that is, switches the first transmission mode to the second transmission mode, and transmits the data through the transmitter antenna with the good transmission channel, so that when transmitter antenna power is not balanced, a probabilistic negative gain incurred to single stream in multiple input multiple output (MIMO) mode compared with legacy high-speed downlink packet access (HSDPA) with single antenna is eliminated or decreased by switching the transmission mode.

Preferably, in the foregoing embodiment, after switching the current first transmission mode to the second transmission mode, the method may further include sending an instruction to the receiver to instruct the receiver to complete the transmission mode switching within a predetermined time.

That is to say, after receiving the transmitter antenna quality information, the transmitter delivers an acknowledgment signal to inform the receiver that the reported transmitter antenna quality information is received, completes the transmission mode switching within agreed time, sends data in the new mode after the switching, and instructs the receiver to complete the transmission mode switching within the predetermined time.

In an embodiment, if the second transmission mode after the switching is the single-antenna sending mode, the method may further include sending pilot information through a transmitter antenna that does not transmit data, so that the receiver measures average signal strength of the transmitter antenna.

That is to say, if the second transmission mode after the switching is the single-antenna sending mode, in addition to that data is transmitted through a single transmitter antenna, pilot information is sent through all transmitter antennas except the transmitter antenna that transmits the data, so that the receiver monitors channel quality of each transmitter antenna, such as the average signal strength.

In an embodiment, the method may further include determining whether the number of the determined transmitter antennas is consistent with the number of transmitter antennas required by the default first transmission mode, and if the determination is yes, continuing transmitting the data by using the first transmission mode and the determined transmitter antenna. The embodiment further includes, if the determination is no, executing the step of switching the first transmission mode to the second transmission mode.

The switching the first transmission mode to the second transmission mode when the number of the determined transmitter antennas is not consistent with the number of transmitter antennas required by the default first transmission mode, if the first transmission mode is the multi-antenna sending mode, and the number of the determined transmitter antennas is one, switching the first transmission mode to the second transmission mode is switching the multi-antenna sending mode to the single-antenna sending mode. If the first transmission mode is the single-antenna sending mode, and when the number of the determined transmitter antennas is more than one, switching the first transmission mode to the second transmission mode is switching the single-antenna sending mode to the multi-antenna sending mode.

That is to say, when the default transmission mode of the transmitter is the multi-antenna sending mode, if the number of the determined transmitter antennas is greater than 1, the data is sent by continuing to use the multi-antenna sending mode. If the number of the determined transmitter antennas is equal to 1, the multi-antenna sending mode is switched to the single-antenna sending mode. In the single-antenna sending mode, if the number of the determined transmitter antennas is greater than 1, the single-antenna sending mode is switched to the multi-antenna sending mode.

When the default transmission mode of the transmitter is the single-antenna sending mode, if the number of the determined transmitter antennas is equal to 1, the data is sent by continuing to use the single-antenna sending mode, and if the number of the determined transmitter antennas is greater than 1, the single-antenna sending mode is switched to the multi-antenna sending mode.

In an embodiment of the present invention, if the default transmission mode of the transmitter is set to the multi-antenna sending mode, after receiving the transmitter antenna quality information reported by the receiver, the transmitter adjusts the data transmission manner, and sends the data by using the transmitter antenna determined according to the transmitter antenna quality information (or by using a transmitter antenna other than the determined transmitter antenna). When only one transmitter antenna among the determined transmitter antennas has good signal quality, the transmitter switches the current multi-antenna sending mode to the single-antenna sending mode. In this embodiment, a requirement that transmission mode switching be acknowledged by an opposite side (the receiver) has two manners.

One is a without-acknowledgement manner. After receiving the transmitter antenna quality information, the transmitter completes the transmission mode switching within agreed time, and sends the data in the new mode after the switching.

The other is an acknowledgement-required manner. After receiving the transmitter antenna quality information sent by the receiver, the transmitter delivers an acknowledgment signal to the receiver to inform that the information reported by the receiver is received, completes the transmission mode switching within agreed time, instructs the receiver to complete the transmission mode switching within the predetermined time, and sends the data by using the new mode after the switching.

The transmitter may then further determine the number of transmitter antennas (transmitter antennas with good channel quality) according to subsequently received transmitter antenna quality information, and if the number of the transmitter antennas is more than one, the transmitter switches the current single-antenna sending mode to the multi-antenna sending mode, and the process is repeated subsequently.

If the default transmission mode of the transmitter is the single-antenna sending mode, in the foregoing process, the transmitter switches the current single-antenna sending mode to the multi-antenna sending mode if multiple transmitter antennas among the determined transmitter antennas have good signal quality. In this embodiment, whether the transmission mode switching is required to be acknowledged by the opposite side (the receiver) has two manners, and reference may be made to the above descriptions for details.

Figure 3:
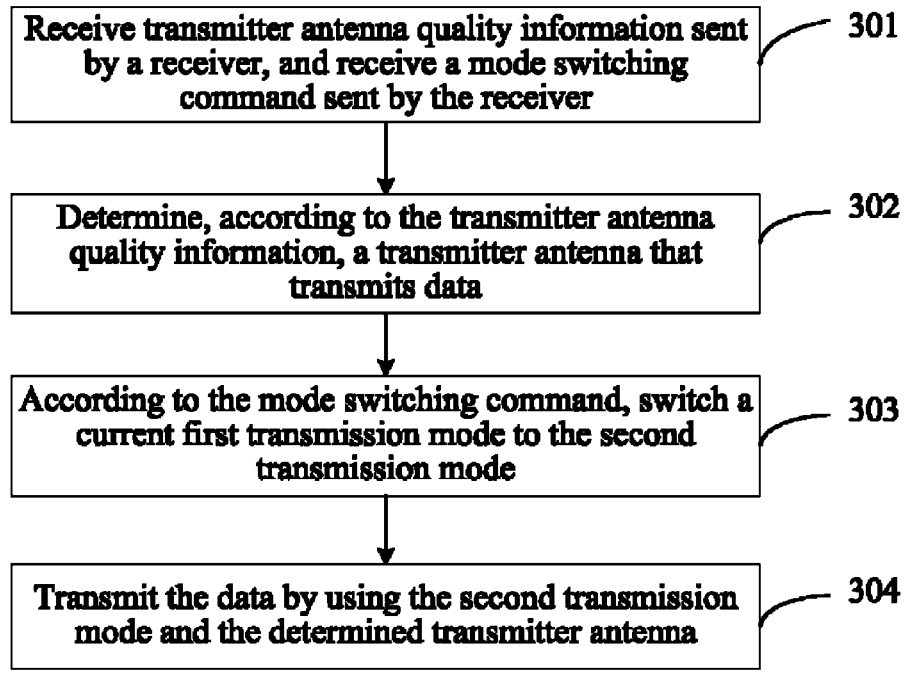
FIG. 3 is a flow chart of a third data transmission method according to an embodiment of the present invention.

Referring to FIG. 3, FIG. 3 is a flow chart of a third data transmission method according to an embodiment of the present invention. The method comprises, in Step 301, receiving transmitter antenna quality information sent by a receiver, and receiving a mode switching command sent by the receiver. The mode switching command includes a channel quality indicator special value, used to indicate a second transmission mode to which a switchover is required. The channel quality indicator special value includes a channel quality indicator 0 or a channel quality indicator 31. For example, the channel quality indicator set to special value 0 indicates that a transmission mode to which a switchover is required is a single-antenna sending mode, a multi-antenna sending mode or the like, and the channel quality indicator set to special value 31 indicates that a transmission mode to which a switchover is required is the single-antenna sending mode, the multi-antenna sending mode or the like.

The transmitter antenna quality information may include a candidate or non-candidate transmitter antenna set, or a precoding control indication implying a candidate or non-candidate transmitter antenna set. In this embodiment, a transmitter antenna with good channel quality is defined as a candidate transmitter antenna, and a transmitter antenna with poor channel quality is defined as a non-candidate transmitter antenna.

In this embodiment, the precoding control indication implying the candidate or non-candidate transmitter antenna set may be a matrix, for example:

single-current:

$$\begin{bmatrix} \frac{1}{\sqrt{2}} \\ \frac{1+j}{2} \end{bmatrix}, \begin{bmatrix} \frac{1}{\sqrt{2}} \\ \frac{1-j}{2} \end{bmatrix}, \begin{bmatrix} \frac{1}{\sqrt{2}} \\ \frac{-1+j}{2} \end{bmatrix}, \begin{bmatrix} \frac{1}{\sqrt{2}} \\ \frac{-1-j}{2} \end{bmatrix}$$

double-current:

$$\begin{bmatrix} \frac{1}{\sqrt{2}} & \frac{1}{\sqrt{2}} \\ \frac{1+j}{2} & -\frac{1+j}{2} \end{bmatrix}, \begin{bmatrix} \frac{1}{\sqrt{2}} & \frac{1}{\sqrt{2}} \\ \frac{1-j}{2} & -\frac{1-j}{2} \end{bmatrix},$$

$$\begin{bmatrix} \frac{1}{\sqrt{2}} & \frac{1}{\sqrt{2}} \\ \frac{-1+j}{2} & -\frac{-1+j}{2} \end{bmatrix}, \begin{bmatrix} \frac{1}{\sqrt{2}} & \frac{1}{\sqrt{2}} \\ \frac{-1-j}{2} & \frac{1+j}{2} \end{bmatrix}.$$

In Step 302, according to the transmitter antenna quality information, a transmitter antenna that transmits data is determined. That is to say, if the transmitter antenna quality information includes a candidate transmitter antenna, the candidate transmitter antenna is selected as the transmitter antenna that transmits the data. If the transmitter antenna quality information includes a non-candidate transmitter antenna, the transmitter may select an antenna other than the non-candidate transmitter antenna among all antennas as the transmitter antenna that transmits the data.

The transmitter antenna quality information may also include both a candidate transmitter antenna and a non-candidate transmitter antenna, and the transmitter directly selects the candidate transmitter antenna as the transmitter antenna that sends the data, so as to transmit the data.

In Step 303, according to the mode switching command, a current first transmission mode is switched to the second transmission mode. After the transmitter antenna that transmits the data is determined in step 302, the transmitter directly switches, according to the channel quality indicator special value, a current transmission mode to a transmission mode indicated by the channel quality indicator special value. For example, if the transmission mode indicated by the channel quality indicator special value is the single-antenna sending mode, the current transmission is switched to the single-antenna sending mode, and if the transmission mode indicated by the channel quality indicator special value is the multi-antenna sending mode, the current transmission is switched to the multi-antenna sending mode. The transmission mode indicated by the channel quality indicator special value may also be an adaptive transmission mode, which is not limited in this embodiment. The channel quality indicator special value includes the channel quality indicator special value 0 or the channel quality indicator special value 31, and may be another value, which is not limited in this embodiment.

In Step 304, the data is transmitted by using the second transmission mode and the determined transmitter antenna. In an embodiment, after switching the current first transmission mode to the second transmission mode, the method may further include sending an instruction to the receiver to instruct the receiver to complete the transmission mode switching within predetermined time. In the embodiment, if the second transmission mode after the switching is the single-antenna sending mode, the method may further include sending pilot information through a transmitter antenna that does not transmit data so that the receiver measures channel quality of each transmitter antenna.

In the embodiment of the present invention, after receiving the transmitter antenna quality information reported by the receiver, the transmitter adjusts a current data transmission manner, and switches, according to the transmission mode indicated by the channel quality indicator special value in the transmitter antenna quality information, from the current transmission mode to the transmission mode indicated by the channel quality indicator special value. The transmitter then transmits the data by using the transmission mode to which a switchover is performed. In the embodiment of the present invention, when transmitter antenna power is not balanced, a probabilistic negative gain incurred to single stream in MIMO mode compared with legacy HSDPA with single antenna is eliminated or decreased by switching the transmission mode.

Figure 4:
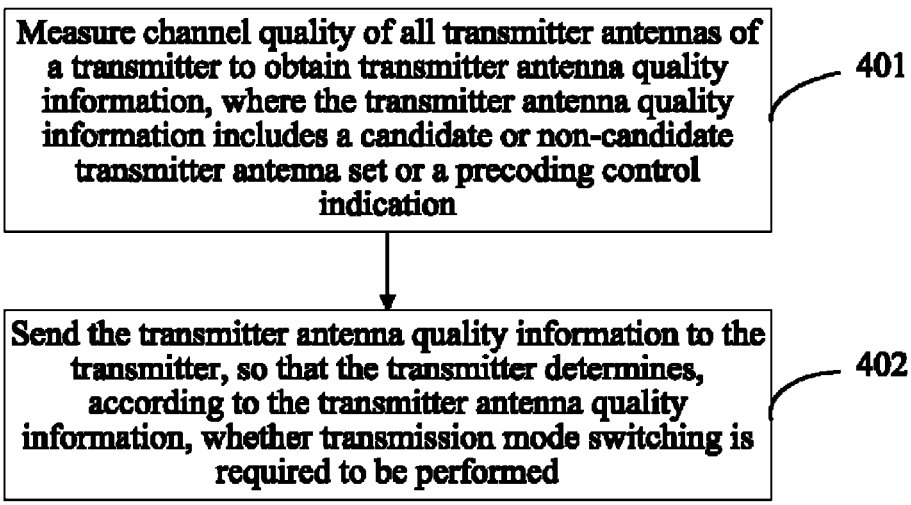
FIG. 4 is a flow chart of a fourth data transmission method according to an embodiment of the present invention.

Referring to FIG. 4, FIG. 4 is a flow chart of a fourth data transmission method according to an embodiment of the present invention. The method comprises, in Step 401, measuring channel quality of all transmitter antennas of a transmitter to obtain transmitter antenna quality information, where the transmitter antenna quality information includes a candidate or non-candidate transmitter antenna set or a precoding control indication implying a candidate or non-candidate transmitter antenna set.

In Step 402, the transmitter antenna quality information is sent to the transmitter so that the transmitter determines, according to the transmitter antenna quality information, whether transmission mode switching is required to be performed.

In step 401, the channel quality of all the transmitter antennas may be measured in a multi-antenna sending mode or in a single-antenna sending mode, so as to obtain respective average signal strength values of all the transmitter antennas, and an average value or a maximum value of the average signal strength values. For example, a receiver measures a signal to noise ratio (SNR), or a signal to interference ratio (SIR), or a signal to interference plus noise ratio (SINR) or the like of a primary/secondary pilot of all the transmitter antennas, so as to obtain average signal strength of all the transmitter antenna and an average value of the average signal strength.

Then, the transmitter antenna quality information is determined according to the respective average signal strength values of all the transmitter antennas and the average value or the maximum value of the average signal strength values.

The determining the transmitter antenna quality information mainly includes determining the transmitter antenna quality information in the multi-antenna sending mode or the single-antenna sending mode. Determining a candidate transmitter antenna or a non-candidate transmitter antenna is taken as an example below.

In the multi-antenna sending mode, two determining manners exist. In one manner, the receiver determines whether a ratio of an average signal strength value of each transmitter antenna to the average value (or the maximum value) of the average signal strength values is greater than a first preset threshold value. If the determination is yes, the receiver determines that the transmitter antenna is a candidate transmitter antenna, otherwise, the receiver determines that the transmitter antenna is a non-candidate transmitter antenna.

In the other manner, the receiver determines whether a difference between an average signal strength value of each transmitter antenna and the average value (or the maximum value) of the average signal strength values is greater than a second preset threshold value. If the determination is yes, the receiver determines that the transmitter antenna is a candidate transmitter antenna, otherwise, the receiver determines that the transmitter antenna is a non-candidate transmitter antenna.

In the single-antenna sending mode, two determining manners also exist. In one manner, the receiver determines whether a ratio of an average signal strength value of each transmitter antenna to the average value (or the maximum value) of the average signal strength values is smaller than a third preset threshold value. If the determination is yes, and the number of transmitter antennas satisfying the third preset threshold value is greater than 1, the receiver determines that the transmitter antenna is a candidate transmitter antenna, otherwise, the transmitter antenna is a non-candidate transmitter antenna.

In the other manner, the receiver determines whether a difference between an average signal strength value of each transmitter antenna and the average value (or the maximum value) of the average signal strength values is smaller than a fourth preset threshold value. If the determination is yes, and the number of transmitter antennas satisfying the fourth preset threshold value is greater than 1, the receiver determines that the transmitter antenna is a candidate transmitter antenna, otherwise, the receiver determines that the transmitter antenna is a non-candidate transmitter antenna.

In this embodiment, the candidate transmitter antenna is a transmitter antenna set with good channel quality, and the non-candidate transmitter antenna is a transmitter antenna set with poor channel quality.

That is to say, in this embodiment, in the multi-antenna sending mode, the receiver measures the channel quality, obtains the average signal strength values of all the transmitter antennas and the maximum value (or the average value) of the average signal strength values within preset time, and when a ratio of an average signal strength value of any antenna to the maximum value (or the average value) of the average signal strength values (or a difference between them) is greater than a certain given threshold value, determines that the signal quality of the transmitter antenna is good (or poor). The receiver sends transmitter antenna quality information to the transmitter to inform the transmitter of a situation that currently some transmitter antennas have a good (or poor) channel condition, and inform the transmitter of specific antennas that have good (or poor) signal quality, so as to indicate a suggestion about selecting (or not selecting) an antenna set.

In the single-antenna sending mode, the transmitter is still required to send pilot information through an antenna that does not transmit data, so that the receiver measures an average signal strength value from the antenna. The receiver measures the average signal strength values from all the antennas of the transmitter, and obtains the maximum value (or the average value) of the average signal strength values. When the ratio of an average signal strength of any antenna to the maximum value (or the average value) of the average signal strength values (or the difference between them) is smaller than a certain given threshold value (the threshold may be different from the foregoing threshold), and the number of antennas satisfying the condition is greater than 1, the receiver sends transmitter antenna quality information to the transmitter, so as to inform the receiver whether to enable a multi-antenna mode and the antennas to be enabled.

The threshold values or preset threshold values in the above descriptions may be the same or different, which is not limited in this embodiment.

In this embodiment, no matter in the multi-antenna sending mode or in the single-antenna sending mode, after receiving the transmitter antenna quality information reported by the receiver, the transmitter completes the transmission mode switching within agreed time, or completes the transmission mode switching within agreed time after sending an acknowledgment signal; and sends the data by using the transmission mode to which a switchover is performed.

In the embodiment, the transmitter always transmits the pilot through each transmitter antenna, and the receiver also always monitors the channel quality of each antenna.

In the embodiment of the present invention, after receiving the transmitter antenna quality information reported by the receiver, the transmitter adjusts a current data transmission manner, switches, according to a transmission mode indicated by a channel quality indicator special value in the transmitter antenna quality information, from the current transmission mode to the transmission mode indicated by the channel quality indicator special value, and transmits the data by using the transmission mode to which a switchover is performed. In the embodiment of the present invention, when transmitter antenna power is not balanced, a probabilistic negative gain incurred to single stream in MIMO mode compared with legacy HSDPA with single antenna is eliminated or decreased by switching the transmission mode.

Figure 5:
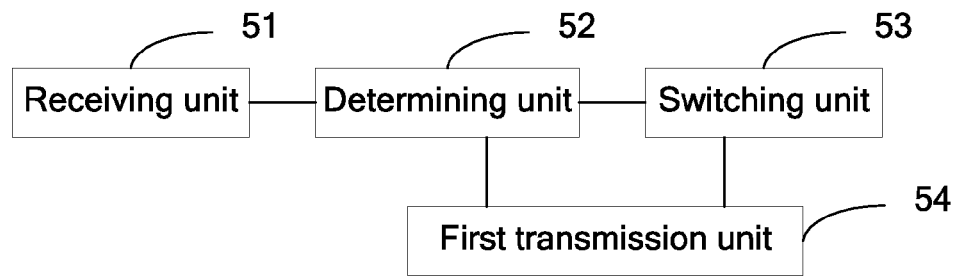
FIG. 5 is a schematic structural diagram of a first data transmission apparatus according to an embodiment of the present invention.

Based on the implementation process of the foregoing method, the present invention provides a first data transmission apparatus, and a schematic structural diagram thereof is shown in FIG. 5. The data transmission apparatus includes a receiving unit 51, a determining unit 52, a switching unit 53, and a first transmission unit 54. The receiving unit 51 is configured to receive transmitter antenna quality information sent by a receiver. The determining unit 52 is configured to determine, according to the transmitter antenna quality information, a transmitter antenna that transmits data. The switching unit 53 is configured to switch a first transmission mode to a second transmission mode when the transmitter antenna quality information satisfies a preset condition. The first transmission unit 54 is configured to transmit the data by using the second transmission mode and the determined transmitter antenna.

Figure 6:
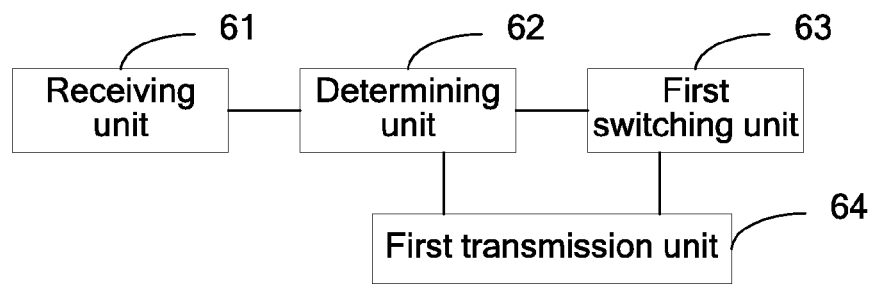
FIG. 6 is a schematic structural diagram of a second data transmission apparatus according to an embodiment of the present invention.

Preferably, based on the foregoing embodiment, the switching unit includes a first switching unit configured to switch the first transmission mode to the second transmission mode when the number of determined transmitter antennas is not consistent with the number of transmitter antennas required by the default first transmission mode. A corresponding schematic structural diagram thereof (a schematic structural diagram of a second data transmission apparatus) is shown in FIG. 6. The shown data transmission apparatus includes a receiving unit 61, a determining unit 62, a first switching unit 63, and a first transmission unit 64. The receiving unit 61 is configured to receive transmitter antenna quality information sent by a receiver. The transmitter antenna quality information may include a candidate transmitter antenna, a non-candidate transmitter antenna, and/or a precoding control indication, and so on. The determining unit 62 is configured to determine, according to the transmitter antenna quality information, a transmitter antenna that transmits data. If the transmitter antenna quality information includes a candidate transmitter antenna, the candidate transmitter antenna is selected as the transmitter antenna that transmits the data. If the transmitter antenna quality information includes a non-candidate transmitter antenna, the transmitter may select an antenna other than the non-candidate transmitter antenna among all antennas as the transmitter antenna that transmits the data. The first switching unit 63 is configured to switch the first transmission mode to a second transmission mode when the number of determined transmitter antennas is not consistent with the number of transmitter antennas required by a default first transmission mode. Switching the first transmission mode to the second transmission mode may be switching a multi-antenna sending mode to a single-antenna sending mode, or switching the single-antenna sending mode to the multi-antenna sending mode. Reference may be made to the above descriptions for a specific implementation process, which is not repeated herein. The first transmission unit 64 is configured to transmit the data by using the second transmission mode and the determined transmitter antenna.

Preferably, the data transmission apparatus may further include a first sending unit, configured to, after the first switching unit switches the current first transmission mode to the second transmission mode, send an instruction to the receiver to instruct the receiver to complete transmission mode switching within predetermined time.

In this embodiment, the data transmission apparatus may, after transmission mode switching, inform the receiver of a transmission mode to which a switchover is performed, and transmit the data by using the transmission mode to which a switchover is performed, or may, after the transmission mode switching, transmit the data by directly using a transmission mode to which a switchover is performed.

Preferably, the apparatus may further include a judgment unit and a second transmission unit. The judgment unit is configured to determine whether the number of the transmitter antennas determined by the determining unit is consistent with the number of transmitter antennas required by the default first transmission mode. A determination result of inconsistency is sent to the first switching unit, and a determination result of consistency is sent to the second transmission unit.

The switching unit is further configured to, after receiving the determination result of inconsistency sent by the judgment unit, switch the first transmission mode to the second transmission mode.

The second transmission unit is configured to, after receiving the determination result of consistency sent by the judgment unit, continue to transmit the data by using the first transmission mode and the determined transmitter antenna.

Preferably, the first switching unit includes a first mode switching unit and/or a second mode switching unit. The first mode switching unit is configured to, when the first transmission mode is the multi-antenna sending mode and the number of the determined transmitter antennas is one, switch the multi-antenna sending mode to the single-antenna sending mode. The second mode switching unit is configured to, when the first transmission mode is the single-antenna sending mode and when the number of the determined transmitter antennas is more than one, switch the single-antenna sending mode to the multi-antenna sending mode.

Preferably, the data transmission apparatus may further include: a second sending unit configured to, when the second transmission mode after the switching is the single-antenna sending mode, send pilot information through a transmitter antenna that does not transmit data, so that the receiver measures channel quality of each transmitter antenna, such as average signal strength of the transmitter antenna.

For an implementation process of functions and effects of the units in the apparatus, reference may be made to the corresponding implementation process in the foregoing method, which is not repeated herein.

In the embodiment of the present invention, when transmitter antenna power is not balanced, a probabilistic negative gain incurred to single stream in MIMO mode compared with legacy HSDPA with single antenna is eliminated or decreased by switching the transmission mode.

Figure 7:
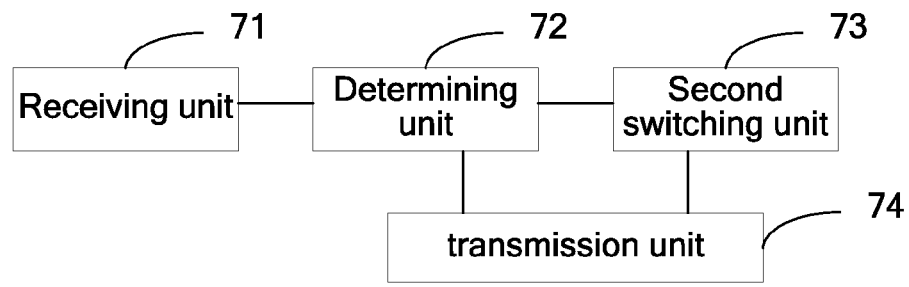
FIG. 7 is a schematic structural diagram of a third data transmission apparatus according to an embodiment of the present invention.

Preferably, based on the embodiment illustrated by FIG. 5, the receiving unit is further configured to receive a transmitter antenna mode switching command sent by the receiver. The switching unit includes a second switching unit configured to switch the current first transmission mode to the second transmission mode according to the mode switching command. A corresponding schematic structural diagram thereof (a schematic structural diagram of a third data transmission apparatus) is shown in FIG. 7. The data transmission apparatus includes a receiving unit 71, a determining unit 72, a second switching unit 73, and a transmission unit 74. The receiving unit 71 is configured to receive a mode switching command and transmitter antenna quality information sent by a receiver. The transmitter antenna quality information includes a candidate transmitter antenna or a non-candidate transmitter antenna, and/or a precoding control indication. The determining unit 72 is configured to determine, according to the transmitter antenna quality information, a transmitter antenna that transmits data. The second switching unit 73 is configured to switch a current first transmission mode to a second transmission mode according to the mode switching command. The transmission unit 74 is configured to transmit the data by using the second transmission mode and the determined transmitter antenna.

The mode switching command received by the receiving unit includes: a channel quality indicator special value used to indicate the second transmission mode to which a switchover is required.

Preferably, the data transmission apparatus may further include: a first sending unit, configured to, after the switching unit switches the current first transmission mode to the second transmission mode, send an instruction to the receiver, to instruct the receiver to complete transmission mode switching within predetermined time.

Preferably, the data transmission apparatus may further include a second sending unit configured to, when the second transmission mode after the switching is the single-antenna sending mode, send pilot information through a transmitter antenna that does not transmit data, so that the receiver measures channel quality of each transmitter antenna.

For an implementation process of functions and effects of the units in the apparatus, reference may be made to the corresponding implementation process in the foregoing method, which is not repeated herein.

Figure 8:
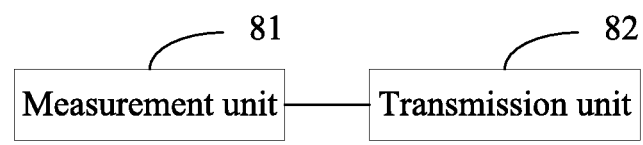
FIG. 8 is a schematic structural diagram of a fourth data transmission apparatus according to an embodiment of the present invention.

Referring to FIG. 8, FIG. 8 is a schematic structural diagram of a fourth data transmission apparatus according to an embodiment of the present invention. The data transmission apparatus includes a measurement unit 81 and a transmission unit 82. The measurement unit 81 is configured to measure channel quality of all transmitter antennas of a transmitter, so as to obtain transmitter antenna quality information. The transmitter antenna quality information includes a candidate or non-candidate transmitter antenna set, or a precoding control indication implying a candidate or non-candidate transmitter antenna set. The transmission unit 82 is configured to send the transmitter antenna quality information to the transmitter, so that the transmitter determines, according to the transmitter antenna quality information, whether transmission mode switching is required to be performed.

The measurement unit includes a channel quality measurement unit and a determining unit. The channel quality measurement unit is configured to measure channel quality of all transmitter antennas in a multi-antenna sending mode or single-antenna sending mode, so as to obtain respective average signal strength values of all transmitter antennas and an average value or a maximum value of the average signal strength values. The determining unit is configured to determine the transmitter antenna quality information according to the respective average signal strength values of all the transmitter antenna and the average value or the maximum value of the average signal strength values.

Preferably, in the multi-antenna sending mode, the determining unit includes a first judgment unit, a first determining unit, and a second determining unit; or, a second judgment unit, a third determining unit, and a fourth determining unit.

The first judgment unit is configured to determine whether a ratio of an average signal strength value of each transmitter antenna to the average value or the maximum value of the average signal strength values is greater than a first preset threshold value, send a determination result of yes to the first determining unit, and send a determination result of no to the second determining unit.

The first determining unit is configured to receive the determination result of yes sent by the first judgment unit, and determine, according to the determination result of yes, that the transmitter antenna is a candidate transmitter antenna.

The second determining unit is configured to receive the determination result of no sent by the first judgment unit, and determine, according to the determination result of no, that the transmitter antenna is a non-candidate transmitter antenna.

The second judgment unit is configured to determine whether a difference between an average signal strength value of each transmitter antenna and the average value or the maximum value of the average signal strength values is greater than a second preset threshold value, send a determination result of yes to the third determining unit, and send a determination result of no to the fourth determining unit.

The third determining unit is configured to receive the determination result of yes sent by the second judgment unit, and determine, according to the determination result of yes, that the transmitter antenna is a candidate transmitter antenna.

The fourth determining unit is configured to receive the determination result of no sent by the second judgment unit, and determine, according to the determination result of no, that the transmitter antenna is a non-candidate transmitter antenna.

Preferably, in the single-antenna sending mode, the determining unit includes a third judgment unit, a fifth determining unit, and a sixth determining unit or, a fourth judgment unit, a seventh determining unit, and an eighth determining unit.

The third judgment unit is configured to determine whether a ratio of an average signal strength value of each transmitter antenna to the average value or the maximum value of the average signal strength values is smaller than a third preset threshold value, and if yes, continue to determine whether the number of transmitter antennas satisfying the third preset threshold value is greater than 1. The third judgment unit is further configured to send a determination result of being greater than 1 to the fifth determining unit, and send a determination result of being smaller than 1 or being greater than the third preset threshold value to the sixth determining unit.

The fifth determining unit is configured to receive the determination result of yes sent by the third judgment unit, and determine, according to the determination result of yes, that the transmitter antenna is a candidate transmitter antenna.

The sixth determining unit is configured to receive the determination result, sent by the third judgment unit, of being smaller than 1 or being greater than the third preset threshold value, and determine, according to the determination result, that the transmitter antenna is a non-candidate transmitter antenna.

The fourth judgment unit is configured to determine whether a difference between an average signal strength value of each transmitter antenna and the average value or the maximum value of the average signal strength values is smaller than a fourth preset threshold value, and if yes, continue to determine whether the number of transmitter antennas satisfying the fourth preset threshold value is greater than 1. The fourth judgment unit is further configured to send a determination result of being greater than 1 to the seventh determining unit, and send a determination result of being smaller than 1 or being greater than the fourth preset threshold value to the eighth determining unit.

The seventh determining unit is configured to receive the determination result of yes sent by the fourth judgment unit, and determine, according to the determination result of yes, that the transmitter antenna is a candidate transmitter antenna.

The sixth determining unit is configured to receive the determination result, sent by the fourth judgment unit, of being smaller than 1 or being greater than the fourth preset threshold value, and determine, according to the determination result, that the transmitter antenna is a non-candidate transmitter antenna.

For an implementation process of functions and effects of the units in the apparatus, reference may be made to the corresponding implementation process in the foregoing method, which is not repeated herein.

Figure 9:
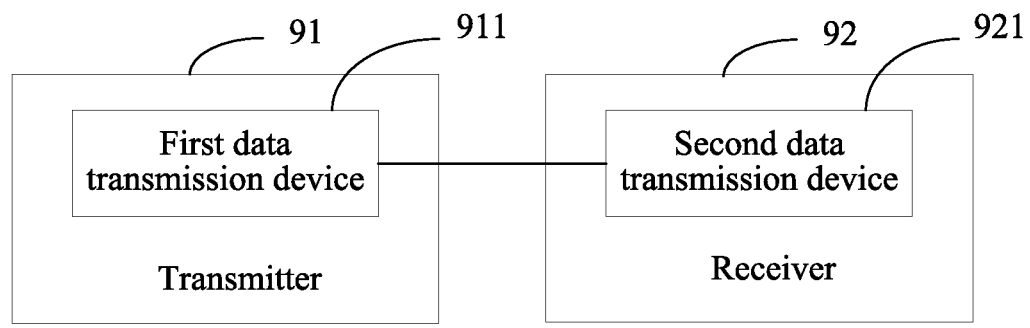
FIG. 9 is a schematic structural diagram of a data transmission system according to an embodiment of the present invention.

Accordingly, an embodiment of the present invention further provides a data transmission system, and a schematic structural diagram thereof is shown in FIG. 9. The data transmission system includes a transmitter 91 and a receiver 92. The transmitter 91 is integrated with a first data transmission apparatus 911. The receiver 92 is integrated with a second data transmission apparatus 921. For the first data transmission apparatus, reference may be made to the data transmission apparatus of the embodiment illustrated by FIG. 5, FIG. 6 or FIG. 7. For the second data transmission apparatus, reference may be made to the data transmission apparatus of the embodiment illustrated by FIG. 8. For details, reference may be made to the above descriptions, which are not repeated herein.

For an implementation process of functions and effects of the units in the data transmission apparatus, reference may be made to the corresponding implementation process in the foregoing method, which is not repeated herein.

For ease of understanding of persons skilled in the art, illustration is provided below by using 2×2MIMO and an example that a report mode switching command includes CQI0 or CQI31.

In this embodiment, an antenna switching (AS) mode is introduced in MIMO, a primary/secondary pilot is still sent in an MIMO mode, and a UE measures an SNR or SIR or SINR of the primary/secondary pilot. In a current mode being the MIMO mode, if it is found that a ratio of the SNR or SIR or SINR of the primary pilot to the SNR or SIR or SINR of the secondary pilot (or a difference between them) keeps being greater than a certain threshold value during a period of time, the UE is triggered to report CQI0 or CQI31, a NodeB performs, through an HS-SCCH order, mode switching from the MIMO mode to the AS mode after receiving the CQI, the primary/secondary pilot is still sent according to MIMO, and data is sent through a single antenna; on the contrary, in the current mode being a single-antenna sending mode (AS), if the ratio of the SNR or SIR or SINR of the primary pilot to the SNR or SIR or SINR of the secondary pilot (or a difference between them) keeps being smaller than a certain threshold value during a period of time, the UE is triggered to report CQI0 or CQI31, the NodeB then switches the single-antenna sending mode back to the MIMO mode, and the primary/secondary pilot and data are sent according to MIMO. For a specific switching process, reference may be made to the embodiments (Embodiment 1 to Embodiment 5) below.

In this embodiment, Embodiment 1, mode switching is triggered by using a CQI special value CQI0 or CQI31 (CQI0 or CQI31 is agreed on in advance).

If a current mode is an MIMO mode, a UE reports CQI0 or CQI31 to trigger an AS mode. After receiving the CQI, a NodeB performs mode switching through an HS-SCCH order. After the AS mode is entered, a primary/secondary pilot is still sent according to MIMO, data is sent through a single antenna and received by a type3 receiver (two antennas balanced receiver), an HS-DPCCH feeds back ACK/NACK, a CQI, and a PCI according to HS-DPCCH typeB (single stream) in MIMO, and a PCI reported by the UE is an AS code book. 00 represents that a primary antenna sends data, but a secondary antenna does not send data, that is, a [1,0] AS code book, and 11 represents that the secondary antenna sends data, but the primary antenna does not send data, that is, a [0,1] AS code book. (Other PCI values may also be used to represent the AS code book)

If the current mode is the AS mode, the UE reports CQI0 or CQI31 to trigger the MIMO mode. After receiving the CQI, the NodeB performs mode switching through the HS-SCCH order. After the MIMO mode is entered, the primary/secondary pilot and data are sent according to MIMO, the HS-DPCCH feeds back ACK/NACK, a CQI, and a PCI according to an HS-DPCCH in MIMO, and a PCI reported by the UE is an MIMO code book.

In embodiment 2, mode switching is triggered by using a CQI special value CQI0 or CQI31 (CQI0 or CQI31 is agreed on in advance).

If a current mode is an MIMO mode, a UE reports CQI0 or CQI31 to trigger an AS mode. After receiving the CQI, a NodeB performs mode switching through an HS-SCCH order. After the AS mode is entered, a primary/secondary pilot is still sent according to MIMO, the NodeB sends data only through a primary antenna, a secondary antenna does not send data, a type3 receiver performs receiving, and an HS-DPCCH feeds back ACK/NACK and a CQI according to an HS-DPCCH in HSDPA.

If the current mode is the AS mode, the UE reports CQI0 or CQI31 to trigger the MIMO mode. After receiving the CQI, the NodeB performs mode switching through the HS-SCCH order. After the MIMO mode is entered, the primary/secondary pilot and data are sent according to MIMO, the HS-DPCCH feeds back ACK/NACK, a CQI, and a PCI according to an HS-DPCCH in MIMO, and a PCI reported by the UE is an MIMO code book.

In embodiment 3, mode switching is triggered by using a CQI special value CQI0 or CQI31 (CQI0 or CQI31 is agreed on in advance).

If a current mode is an MIMO mode, a UE reports CQI0 or CQI31 to trigger an AS mode, and a PCI reported at the same time is an AS code book. An HS-DPCCH feeds back ACK/NACK, a CQI, and a PCI according to an HS-DPCCH in MIMO, or it is limited that the ACK/NACK, the CQI, and the PCI are fed back only according to HS-DPCCH typeB (single stream) in MIMO. After receiving the CQI and the PCI, a NodeB enters the AS mode, a primary/secondary pilot is still sent according to MIMO, data is sent through a single antenna and received by a type3 receiver, the HS-DPCCH feeds back the ACK/NACK, the CQI, and the PCI according to the HS-DPCCH typeB (single stream) in MIMO, and the PCI reported by the UE is the AS code book. 00 represents that a primary antenna sends data, but a secondary antenna does not send data, that is, a [1,0] AS code book, and 11 represents that the secondary antenna sends data, but the primary antenna does not send data, that is, a [0,1] AS code book. (Other PCI values may also be used to represent the AS code book)

If the current mode is the AS mode, the UE reports CQI0 or CQI31 to trigger the MIMO mode, and a PCI reported at the same time is an MIMO code book. The HS-DPCCH feeds back ACK/NACK, a CQI, and a PCI according to an HS-DPCCH in MIMO, or it is limited that the ACK/NACK, the CQI, and the PCI are fed back only according to an HS-DPCCH typeB (single stream) in MIMO. After receiving the CQI and the PCI, the NodeB enters the MIMO mode, the primary/secondary pilot and data are sent according to MIMO, the HS-DPCCH feeds back the ACK/NACK, the CQI, and the PCI according to the HS-DPCCH in MIMO, and the PCI reported by the UE is the MIMO code book.

Embodiment 4

In embodiment 4, mode switching is triggered by using a CQI special value CQI0 or CQI31 (CQI0 or CQI31 is agreed on in advance).

If a current mode is an MIMO mode, a UE reports CQI0 or CQI31 to trigger an AS mode, a PCI reported at the same time is an AS code book (00 represents that a primary antenna sends data, but a secondary antenna does not send data, that is, a [1,0] AS code book, and 11 represents that the secondary antenna sends data, but the primary antenna does not send data, that is, a [0,1] AS code book, and other PCI values may also be used to represent the AS code book), and an HS-DPCCH feeds back ACK/NACK, a CQI, and a PCI according to an HS-DPCCH in MIMO. After receiving the CQI and the PCI, a NodeB enters the AS mode. A primary/secondary pilot is still sent according to MIMO, data is sent through a single antenna according to the AS code book reported during switching and received by type3, the HS-DPCCH feeds back the ACK/NACK and the CQI according to an HS-DPCCH in HSDPA, and antenna selection is no longer performed on the antenna.

If the current mode is the AS mode, the UE reports CQI0 or CQI31 to trigger the MIMO mode, and a PCI reported at the same time is an MIMO code book. The HS-DPCCH feeds back ACK/NACK, a CQI, and a PCI according to an HS-DPCCH in MIMO. After receiving the CQI and the PCI, the NodeB enters the MIMO mode, the primary/secondary pilot and data are sent according to MIMO, the HS-DPCCH feeds back the ACK/NACK, the CQI, and the PCI according to the HS-DPCCH in MIMO, and the PCI reported by the UE is the MIMO code book.

In embodiment 5, mode switching is triggered by using CQI special values CQI0 and CQI31.

If a current mode is an MIMO mode, a UE reports CQI0 or CQI31 to trigger an AS mode. CQI0 represents that a primary antenna sends data, but a secondary antenna does not send data, that is, a [1,0] AS code book, and CQI31 represents that the secondary antenna sends data, but the primary antenna does not send data, that is, a [0,1] AS code book. After receiving the CQI, a NodeB enters an AS mode after performing mode switching through an HS-SCCH order, or directly enters the AS mode. A primary/secondary pilot is still sent according to MIMO, data is sent through a single antenna according to a CQI value that triggers the mode switching and received through type3. An HS-DPCCH feeds back ACK/NACK, a CQI, and a PCI according to HS-DPCCH typeB (single stream) in MIMO, and a PCI reported by the UE is an AS code book, or the HS-DPCCH feeds back the ACK/NACK and the CQI according to an HS-DPCCH in HSDPA, and the antenna is no longer subject to antenna selection.

If the current mode is the AS mode, the UE can trigger the MIMO mode by reporting CQI0 or CQI31. After receiving the CQI, the NodeB enters the MIMO mode after performing mode switching through the HS-SCCH order, or directly enters the MIMO mode. The HS-DPCCH feeds back ACK/NACK, a CQI, and a PCI according to an HS-DPCCH in MIMO, and a PCI reported by the UE is an MIMO code book.

In the embodiment of the present invention, during downlink 2×2MIMO, the AS mode is introduced, and the transmission mode switching is triggered by using the CQI special value CQI0 or/and CQI31. When received power of two transmitter antennas is not balanced, a probabilistic negative gain incurred to single stream in MIMO mode compared with legacy HSDPA with single antenna is eliminated or decreased through transmission mode switching, such as, switching the current MIMO mode to the AS mode, and after the transmitter antenna power is balanced, the MIMO mode is switched back to.

It should be noted that, in this document, relational terms such as first and second are only used to separate one entity or operation from another entity or operation, and do not necessarily require or imply that an actual relationship or order exists between the entities or operations. Also, the terms "include", "contain", or any other variation thereof, are intended to cover a non-exclusive inclusion, so that a process, a method, an article, or a device that includes a list of elements does not include only those elements but may include other elements not expressly listed or inherent to such process, method, article, or device. An element preceded by "includes a/an . . . " does not, without more constraints, preclude the existence of additional identical elements in the process, method, article, or device that includes the element.

Through the above description of the implementation, persons skilled in the art can clearly understand that the present invention may be implemented through software plus a necessary universal hardware platform, and definitely, may also be implemented through hardware. However, in many cases, the former is a preferred implementation manner. Based on such understanding, essence of the above technical solutions or the part that makes contributions to the prior art can be embodied in the form of a software product. The computer software product may be stored in a storage medium such as a ROM/RAM, a magnetic disk, or an optical disk, and include several instructions to make computer equipment (for example, a personal computer, a server, or network equipment) execute the methods described in the embodiments of the present invention or in some parts of the embodiments of the present invention.

What are described above are only exemplary embodiments of the present invention. It should be noted that, for persons of ordinary skill in the art, several improvements and modifications may be made without departing from the principles of the present invention, and these improvements and modifications shall be construed as falling within the protection scope of the present invention.

What is claimed is:

1. A data transmission method, comprising:
receiving transmitter antenna quality information sent by a receiver;
determining, according to the transmitter antenna quality information, a transmitter antenna that transmits data;
switching a first transmission mode to a second transmission mode when the transmitter antenna quality information satisfies a preset condition, wherein at least one of the first transmission mode or the second transmission mode is a single-antenna sending mode; and
transmitting the data by using the second transmission mode and the determined transmitter antenna;
wherein the transmitter antenna quality information indicates a candidate or non-candidate transmitter antenna set;
wherein, in a multi-antenna sending mode, a candidate transmitter antenna is an antenna of a set of transmitter antennas with at least one transmitter antenna quality measurement that is greater than a respective preset threshold value, and a non-candidate transmitter antenna is an antenna without at least one transmitter antenna quality measurement that is greater than a respective preset threshold value; and
wherein the at least one transmitter antenna quality measurement is at least one of a ratio of, or a difference between, an average signal strength value for each transmitter antenna of the set of transmitter antennas and an average value or maximum value of the average signal strength values for the set of transmitter antennas.

2. The method according to claim 1, wherein the switching the first transmission mode to the second transmission mode comprises switching the first transmission mode to the second transmission mode when a number of determined transmitter antennas is not consistent with a number of transmitter antennas required by the first transmission mode.

3. The method according to claim 1, wherein the method further comprises:
receiving a transmitter antenna mode switching command sent by the receiver;
wherein the switching the first transmission mode to the second transmission mode comprises switching the first transmission mode to the second transmission mode according to the transmitter antenna mode switching command.

4. The method according to claim 3, wherein the transmitter antenna mode switching command comprises a channel quality indicator special value indicating the second transmission mode to which a switchover is required; and
wherein the channel quality indicator special value comprises a channel quality indicator 0 or a channel quality indicator 31.

5. The method according to claim 1, wherein the second transmission mode to which a switchover is performed is a single-antenna sending mode and wherein the method further comprises sending pilot information through a transmitter antenna that does not transmit data, so that the receiver measures channel quality of a transmitter antenna.

6. The method according to claim 1, wherein, when a number of determined transmitter antennas is not consistent with a number of transmitter antennas required by the first transmission mode, the switching the first transmission mode to the second transmission mode comprises:
switching a multi-antenna sending mode to a single-antenna sending mode if the first transmission mode is a multi-antenna sending mode and the number of determined transmitter antennas is one; and
switching the single-antenna sending mode to the multi-antenna sending mode if the first transmission mode is the single-antenna sending mode and the number of determined transmitter antennas is more than one.

7. A data transmission method, comprising:
measuring channel quality of all transmitter antennas of a transmitter to obtain transmitter antenna quality information, wherein the transmitter antenna quality information comprises a candidate or non-candidate transmitter antenna set or a precoding control indication implying a candidate or non-candidate transmitter antenna set, wherein a candidate transmitter antenna is an antenna with the transmitter antenna quality above a predetermined antenna quality threshold, and wherein a non-candidate transmitter antenna is an antenna with a transmitter antenna quality that is not above the predetermined antenna quality threshold; and
sending the transmitter antenna quality information to the transmitter, so that the transmitter determines, according to the transmitter antenna quality information, whether transmission mode switching is required to be performed;
wherein a first transmitter antenna quality measurement is a ratio of an average signal strength value for each transmitter antenna to an average value or a maximum value of the average signal strength values for all of the transmitter antennas;
wherein a second transmitter antenna quality measurement is a difference between an average signal strength value of each transmitter antenna and one of the average value or the maximum value of the average signal strength values for all of the transmitter antennas;
wherein, in a multi-antenna sending mode, a candidate transmitter antenna is an antenna with a first transmitter antenna quality measurement that is greater than a first preset threshold value or a second transmitter antenna quality measurement that is greater than a second preset threshold value; and
wherein, in a multi-antenna sending mode, a non-candidate transmitter antenna is an antenna with neither a first transmitter antenna quality measurement that is greater than the first preset threshold value nor a second transmitter antenna quality measurement that is greater than the second preset threshold value.

8. The method according to claim 7, wherein the measuring the channel quality of all the transmitter antennas comprises:
in a multi-antenna sending mode or a single-antenna sending mode, measuring the channel quality of each of the transmitter antennas to obtain the respective average signal strength values of each of the respective transmitter antennas and the average value or the maximum value of the average signal strength values of all of the transmitter antennas; and
determining the transmitter antenna quality information according to the respective average signal strength values of each of the transmitter antennas and the average value or the maximum value of the average signal strength values of all of the transmitter antennas.

9. The method according to claim 8, wherein in the multi-antenna sending mode, the determining the transmitter antenna quality information comprises:
determining whether the first transmitter antenna quality measurement for each transmitter antenna is greater than the first preset threshold value, and if yes, determining that the respective transmitter antenna is a candidate transmitter antenna, otherwise, determining that the respective transmitter antenna is a non-candidate transmitter antenna; or
determining whether the second transmitter antenna quality measurement for each transmitter antenna is greater than the second preset threshold value, and if yes, determining that the respective transmitter antenna is a candidate transmitter antenna, otherwise, determining that the respective transmitter antenna is a non-candidate transmitter antenna.

10. The method according to claim 8, wherein in the single-antenna sending mode, the determining a candidate transmitter antenna or a non-candidate transmitter antenna according to the average signal strength values of the transmitter antennas and the average value or the maximum value of the average signal strength comprises:
determining whether the first transmitter antenna quality measurement of each transmitter antenna is smaller than a third preset threshold value, and if yes, and a number of transmitter antennas satisfying the third preset threshold value is greater than 1, determining that the respective transmitter antenna is a candidate transmitter antenna, otherwise, determining that the respective transmitter antenna is a non-candidate transmitter antenna; or
determining whether the second transmitter antenna quality measurement of each transmitter antenna is smaller than a fourth preset threshold value, and if yes, and a number of transmitter antennas satisfying the fourth preset threshold value is greater than 1, determining that the respective transmitter antenna is a candidate transmitter antenna, otherwise, determining that the respective transmitter antenna is a non-candidate transmitter antenna.

11. A data transmission apparatus, comprising:
a receiving unit, configured to receive transmitter antenna quality information sent by a receiver;
a determining unit, configured to determine, according to the transmitter antenna quality information, a transmitter antenna that transmits data;
a switching unit, configured to switch a first transmission mode to a second transmission mode when the transmitter antenna quality information satisfies a preset condition, wherein at least one of the first transmission mode or the second transmission mode is a single-antenna sending mode; and a first transmission unit, configured to transmit the data by using the second transmission mode and the determined transmitter antenna:, wherein the transmitter antenna quality information indicates a candidate or non-candidate transmitter antenna set;

wherein, in a multi-antenna sending mode, a candidate transmitter antenna is an antenna of a set of transmitter antennas with at least one transmitter antenna quality measurement that is greater than a respective preset threshold value, and a non-candidate transmitter antenna is an antenna without at least one transmitter antenna quality measurement that is greater than a respective preset threshold value; and wherein the at least one transmitter antenna quality measurement is at least one of a ratio of, or a difference between, an average signal strength value for each transmitter antenna of the set of transmitter antennas and an average value or maximum value of the average signal strength values for the set of transmitter antennas.

12. The apparatus according to claim 11, wherein the switching unit comprises:
a first switching unit, configured to switch the first transmission mode to the second transmission mode when a number of determined transmitter antennas is not consistent with a number of transmitter antennas required by the first transmission mode.

13. The apparatus according to claim 11, wherein the receiving unit is further configured to receive a transmitter antenna mode switching command sent by the receiver; and
wherein the switching unit comprises a second switching unit configured to switch a current first transmission mode to the second transmission mode according to the transmitter antenna mode switching command.

14. The apparatus according to claim 13, wherein the transmitter antenna mode switching command received by the receiving unit comprises a channel quality indicator special value indicating the second transmission mode to which a switchover is required.

15. The apparatus according claim 11, further comprising:
a second sending unit, configured to, when the second transmission mode to which a switchover is performed is a single-antenna sending mode, send pilot information through a transmitter antenna that does not transmit data, so that the receiving unit measures channel quality of a transmitter antenna.

16. The apparatus according to claim 11, wherein the switching unit comprises:
a first mode switching unit, configured to, when the first transmission mode is a multi-antenna sending mode and a number of determined transmitter antennas is one, switch the multi-antenna sending mode to a single-antenna sending mode; and
a second mode switching unit, configured to, when the first transmission mode is a single-antenna sending mode and a number of determined transmitter antennas is more than one, switch the single-antenna sending mode to a multi-antenna sending mode.

17. A data transmission apparatus, comprising:
a measurement unit, configured to measure channel quality each transmitter antenna of a transmitter to obtain transmitter antenna quality information, wherein the transmitter antenna quality information comprises a candidate or non-candidate transmitter antenna set or a precoding control indication implying a candidate or non-candidate transmitter antenna set, a ratio of an average signal strength value of each of the transmitter antennas to the average value or the maximum value of the average signal strength values is greater than a first preset threshold value;

a transmission unit, configured to send the transmitter antenna quality information to the transmitter, so that the transmitter determines, according to the transmitter antenna quality information, whether transmission mode switching is required to be performed;

wherein a first transmitter antenna quality measurement is a ratio of an average signal strength value for each transmitter antenna to an average value or a maximum value of the average signal strength values for all of the transmitter antennas;

wherein a second transmitter antenna quality measurement is a difference between an average signal strength value of each transmitter antenna and one of the average value or the maximum value of the average signal strength values for all of the transmitter antennas;

wherein, in a multi-antenna sending mode, a candidate transmitter antenna is an antenna with a first transmitter antenna quality measurement that is greater than a first preset threshold value or a second transmitter antenna quality measurement that is greater than a second preset threshold value; and wherein, in the multi-antenna sending mode, a non-candidate transmitter antenna is an antenna with neither a first transmitter antenna quality measurement that is greater than the first preset threshold value nor a second transmitter antenna quality measurement that is greater than the second preset threshold value.

18. The apparatus according to claim 17, wherein the measurement unit comprises:
a channel quality measurement unit, configured to, in the multi-antenna sending mode or a single-antenna sending mode, measure the channel quality of all the transmitter antennas to obtain the respective average signal strength values of all the transmitter antennas and the average value or the maximum value of the average signal strength values; and
a determining unit, configured to determine the transmitter antenna quality information according to the respective average signal strength values of all the transmitter antenna and the average value or the maximum value of the average signal strength values.

19. The apparatus according to claim 18, wherein the determining unit comprises:
a first judgment unit, a first determining unit, and a second determining unit; or
a second judgment unit, a third determining unit, and a fourth determining unit;
wherein the first judgment unit is configured to determine, in the multi-antenna sending mode, whether the first transmitter antenna quality measurement for each transmitter antenna is greater than the first preset threshold value;
wherein the first judgment unit is further configured to send a determination result of yes to the first determining unit, and send a determination result of no to the second determining unit;
wherein the first determining unit is configured to receive the determination result of yes sent by the first judgment unit, and determine, according to the determination result of yes, that a transmitter antenna is a candidate transmitter antenna;

wherein the second determining unit is configured to receive the determination result of no sent by the first judgment unit, and determine, according to the determination result of no, that the transmitter antenna is a non-candidate transmitter antenna;

wherein the second judgment unit is configured to determine, in the multi-antenna sending mode, whether the second transmitter antenna quality measurement for each transmitter antenna is greater than the second preset threshold value;

wherein the second judgment unit is further configured to send a determination result of yes to the third determining unit, and send a determination result of no to the fourth determining unit;

wherein the third determining unit is configured to receive the determination result of yes sent by the second judgment unit, and determine, according to the determination result of yes, that a transmitter antenna is a candidate transmitter antenna; and wherein the fourth determining unit is configured to receive the determination result of no sent by the second judgment unit, and determine, according to the determination result of no, that the transmitter antenna is a non-candidate transmitter antenna.

20. The apparatus according to claim 18, wherein the determining unit comprises:

a third judgment unit, a fifth determining unit, and a sixth determining unit; or a fourth judgment unit, a seventh determining unit, and an eighth determining unit;

wherein the third judgment unit is configured to determine, in the single-antenna sending mode, whether the first transmitter antenna quality measurement for each transmitter antenna is smaller than a third preset threshold value, and if yes, continue to determine whether a number of transmitter antennas satisfying the third preset threshold value is greater than 1;

wherein the third judgment unit is further configured send a determination result of being greater than 1 to the fifth determining unit, and send a determination result of being smaller than 1 or being greater than the third preset threshold value to the sixth determining unit;

wherein the fifth determining unit is configured to receive the determination result of yes sent by the third judgment unit, and determine, according to the determination result of yes, that a transmitter antenna is a candidate transmitter antenna;

wherein the sixth determining unit is configured to receive the determination result, sent by the third judgment unit, of being smaller than 1 or being greater than the third preset threshold value, and determine, according to the determination result, that the transmitter antenna is a non-candidate transmitter antenna;

wherein the fourth judgment unit is configured to determine, in the single-antenna sending mode, whether the second transmitter antenna quality measurement for each transmitter antenna is smaller than a fourth preset threshold value, and if yes, continue to determine whether a number of transmitter antennas satisfying the fourth preset threshold value is greater than 1;

wherein the fourth judgment unit is further configured to send a determination result of being greater than 1 to the seventh determining unit, and send a determination result of being smaller than 1 or being greater than the fourth preset threshold value to the eighth determining unit;

wherein the seventh determining unit is configured to receive the determination result of yes sent by the fourth judgment unit, and determine, according to the determination result of yes, that the transmitter antenna is a candidate transmitter antenna; and wherein the sixth determining unit is configured to receive the determination result, sent by the fourth judgment unit, of being smaller than 1 or being greater than the fourth preset threshold value, and determine, according to the determination result, that the transmitter antenna is a non-candidate transmitter antenna.

* * * * *

UNITED STATES PATENT AND TRADEMARK OFFICE
CERTIFICATE OF CORRECTION

PATENT NO. : 9,083,406 B2  
APPLICATION NO. : 14/290376  
DATED : July 14, 2015  
INVENTOR(S) : Wenying Xu Page 1 of 1

It is certified that error appears in the above-identified patent and that said Letters Patent is hereby corrected as shown below:

In the Claims

In Col. 21, line 6, claim 11, following transmitter antenna, delete ":," and insert --;--.

Signed and Sealed this
Eighth Day of December, 2015

Michelle K. Lee
*Director of the United States Patent and Trademark Office*